United States Patent [19]

Chouinard

[11] Patent Number: 4,482,276
[45] Date of Patent: Nov. 13, 1984

[54] AIR LOCK VALVE FOR PNEUMATIC CONVEYING SYSTEM

[75] Inventor: Joseph R. C. Chouinard, Pleasantville, Canada

[73] Assignee: Atlantic Bridge Company Limited, Nova Scotia, Canada

[21] Appl. No.: 425,913

[22] Filed: Sep. 28, 1982

[30] Foreign Application Priority Data

Oct. 13, 1981 [CA] Canada .................................. 387777

[51] Int. Cl.³ ............................................. B65G 53/60
[52] U.S. Cl. .................................... 406/169; 222/494; 414/217
[58] Field of Search ............... 406/168, 169, 170, 173, 406/175; 222/494, 502; 414/217, 221; 137/849; 193/21, 25 E, 25 R

[56] References Cited

U.S. PATENT DOCUMENTS

| | | |
|---|---|---|
| 1,607,993 | 11/1926 | Loewy . |
| 2,188,191 | 1/1940 | Roos . |
| 2,457,756 | 12/1948 | Vest . |
| 2,546,709 | 3/1951 | Abarr . |
| 3,121,578 | 2/1964 | Moses . |
| 3,167,089 | 1/1965 | Gordon . |
| 3,297,370 | 1/1967 | Moriarity . |
| 3,324,906 | 6/1967 | Chu . |
| 3,365,240 | 1/1968 | Gordon . |
| 3,396,763 | 8/1968 | Pernis . |
| 3,726,436 | 4/1973 | Despain et al. . |
| 3,842,992 | 10/1974 | Herold ............................. 222/502 X |
| 3,923,210 | 12/1975 | Jackson . |

FOREIGN PATENT DOCUMENTS

| | | |
|---|---|---|
| 588192 | 12/1959 | Canada . |
| 708829 | 5/1965 | Canada . |
| 761331 | 6/1967 | Canada . |
| 1001377 | 12/1976 | Canada . |
| 1021270 | 11/1977 | Canada . |
| 1556010 | 1/1970 | Fed. Rep. of Germany . |
| 2336492 | 2/1975 | Fed. Rep. of Germany . |
| 2361247 | 6/1975 | Fed. Rep. of Germany . |
| 1162930 | 9/1969 | United Kingdom . |

*Primary Examiner*—Jeffrey V. Nase
*Assistant Examiner*—Daniel R. Edelbrock
*Attorney, Agent, or Firm*—Stevens, Davis, Miller & Mosher

[57] ABSTRACT

A pneumatic conveying system including an air separator chamber having an exhaust fan connected thereto to produce a partial vacuum in such chamber is described. An inlet duct is connected to the chamber through which material is conveyed by air flow into the chamber. The chamber includes an exit section within which material separated by gravity/momentum forces collect, such exit section having an air lock valve therein as described below. This valve is arranged such that in the closed position of the valve, the pyramid-like configuration is inverted with the apex of the pyramid being directed downwardly. The air lock valve includes a plurality of flexible panels and a support structure operatively connected thereto. Such panel are movable between an open position for passage of material through the valve and a closed position. The panels together define an open-sleeve-like structure in the open condition of the valve. The panels are adapted to cooperate with the support structure such that as the flexible panels move toward the closed position under the influence of a differential in air pressure across the valve, such panels fold or flex in a predetermined manner such that selected sections of same come into cooperating relationship with one another to define a pyramid-like configuration.

6 Claims, 10 Drawing Figures

AIR LOCK VALVE FOR PNEUMATIC CONVEYING SYSTEM

BACKGROUND OF THE INVENTION

This invention relates in general to the handling of articles and, in particular, to improvements in apparatus for the conveying and handling of various materials by means of air flow. The invention particularly relates to an improved air lock system for use in the pneumatic conveyance of various bulk materials with particular reference being had to the pneumatic unloading and conveyance of bulk cargo (e.g. fish) from ships wherein any damage to the product (including bruising, crushing or slicing) is of foremost concern and must be avoided if at all possible.

A typical prior art vacuum conveyance system employs an air separator chamber wherein material entering with the air flow through an elongated conveying duct can settle out under the influence of gravity/momentum forces onto a sloped or conical bottom surface. The collected material must be extracted through some form of air lock either on a continuous or batch basis. To maintain the negative air pressure necessary for conveyance of the material through the inlet conveying duct, the air leakage back through the material exit must be minimal. Several different types of apparatus are commonly employed to achieve this effect.

In one common form of prior art device, a rotary valve is employed having a plurality of radially extending vanes which come into close contact with the walls of the valve chamber. As such valve rotates, the material moves downwardly into the spaces between the vanes and is thence carried around by the rotary valve and discharged through a bottom exit. Another type of valve employs a rigid door which is hinged to one side of the material discharge duct. This door is periodically opened to discharge the material which has collected at the bottom of the discharge duct. The disadvantage with both of these systems is that they require control means responsive to the level of the material which is built up coupled with powered actuators. The failure of the actuating systems can cause the material to back up to the extent where damage is caused to certain components of the system including the air mover (e.g. suction fan). Moreover, when such arrangements are used in the conveyance of relatively large objects (such as fish) the sealing edges of the valves either tend to jam open or cause unacceptable crushing damage to a relatively large proportion of the articles being conveyed during normal operation.

Another form of system employs a head tube which is immersed in a bath of water thereby forming what is known as a "water trap seal". One form of such apparatus is illustrated in European Published application No. 80/100611.5 in the name of the assignee of the present invention. The advantage of this arrangement is that it does not tend to damage certain fairly delicate articles, such as fish, and moreover provides continuous material discharge onto the output conveyor. The system has several disadvantages however. It cannot be used where the materials must be kept dry. The system has a large daily consumption of fresh water. An even greater problem is the environmental problem raised by the daily disposal of contaminated water. Buoyant materials, such as ice, cause blockage problems or even require a very long head tube. The system is not practical for use with high negative pressures greater than 30 inches water gauge due to the large quantity of water drawn into the head tube and the resulting increase in overall height.

Another form of air lock valve incorporates the use of a heavy flexible rubber sleeve which is connected to the lower end of the discharge or head tube. Under the influence of the negative pressures in the separator chamber, the walls of the rubber tube collapse inwardly toward one another thus forming an air seal. Experience has shown that for a natural gravity discharge to occur, a relatively large material head is required and this material as collected discharges intermittently only after such relatively large head of material has built up. This requires an impractically large conveyor or fluming system to accept the intermittent and relatively large volumes of material discharged. In the case where negative pressures greater than about 10 inches water gauge are involved or where the overall head tube height must be restricted, material height or level controls must be employed which function to periodically cause a reduction in negative air pressure thereby to permit discharge of the material. This causes an interruption of the conveying operation since the lowering of the negative air pressure reduces air velocity through the inlet conveying duct to the point where material cannot be transported.

SUMMARY OF THE INVENTION

It is a general object of the present invention to provide an improved air lock valve which is capable of alleviating, to a very significant extent, the problems inherent in the various prior art devices discussed above.

Thus the present invention in one aspect provides an air lock valve including a plurality of flexible panel means and a support structure operatively connected thereto. Such panel means are movable between an open position for passage of material through the valve and a closed position. The panel means together define an open sleeve-like structure in the open condition of the valve. The panel means are adapted to cooperate with the support structure such that as the flexible panel means move toward the closed position under the influence of a differential in air pressure across the valve, such panel means fold or flex in a predetermined manner such that selected sections of same come into cooperating relationship with one another to define a pyramid-like configuration.

As a further aspect of the invention there is provided a pneumatic conveying system including an air separator chamber having an exhaust fan connected thereto to produce a partial vacuum in such chamber. An inlet duct is connected to the chamber through which material is conveyed by air flow into the chamber. The chamber includes an exit section within which material separated by gravity/momentum forces collect, such exit section having an air lock valve therein as described above. This valve is arranged such that in the closed position of the valve, the pyramid-like configuration is inverted with the apex of the pyramid being directed downwardly.

The support structure associated with the flexible panel means typically comprises an outline type frame adapted to be connected to the exit section of the separator chamber together with a plurality of arms each pivotally connected to the frame and secured to the flexible panel means in a prescribed fashion. Further features of the invention include resilient biasing means associated with the arms in such a manner so as to assist the material which is to pass through the valve in opening same against the influence of air pressure forces which, during use, are created by the partial vacuum in the separating chamber. As a further feature of the invention, damping means may be associated with such arms to eliminate bouncing of same and fluttering of the panels under the influence of the various forces acting thereon.

A further feature of the invention is that the panels are sufficiently flexible that, during use, portions of same flex and come into close conformity with irregular objects as they pass through the valve thus maintaining a tight air seal and preventing loss of the partial vacuum in the separating chamber.

In the preferred form of the invention, stop means are provided for limiting the inward pivoting motion of the arms. Each of the flexible panels is connected between an adjacent pair of such arms with each of the panel side fastening margins being connected along an associated arm and the top fastening margins of the panels being connected to and around the frame in air tight fashion. The flexible panels have a configuration and are arranged to cooperate with the arms such that as the panels and the arms move inwardly under the influence of negative pressures within the chamber, the panels each fold about lines extending from the outer extremities of the top margins of same to a point located midway along the length of the bottom edge of the panel. The panel is thus divided by these folds into an intermediate triangular area which is flanked by a pair of marginal triangular areas. As the arms continue to pivot inwardly and reach the limit defined by the stop means, such marginal triangular areas come together in face-to-face sealing relationship with the intermediate triangular areas together forming a pyramid-like configuration having an apex defined at the location where such points on the bottom edges of the panels come together.

By virtue of the above arrangement, the frame and support arms support the flexible panels against the air pressure forces with the flexible panels being stressed only in tension. With the material being stressed only in tension, any tendency for the material to buckle or misalign under high pressures is avoided thus providing a controllable and consistent air seal. Collected material can push its way through the apex of the pressurized pyramid-like configuration by virtue of the weight of collected material above it. The thin flexible panel material tends to mold itself around large irregular objects thus maintaining the necessary tight air seal during discharge. Bruising, crushing or slicing of the product by the valve described herein is substantially eliminated as compared with prior art arrangements.

Other features of the invention and the advantages associated with same will be better understood from the description of a preferred embodiment of same which is set forth hereafter.

BRIEF DESCRIPTION OF THE VIEWS OF DRAWINGS

In drawings which illustrate an embodiment of the invention.

DETAILED DESCRIPTION OF PREFERRED EMBODIMENTS

Figure 1:
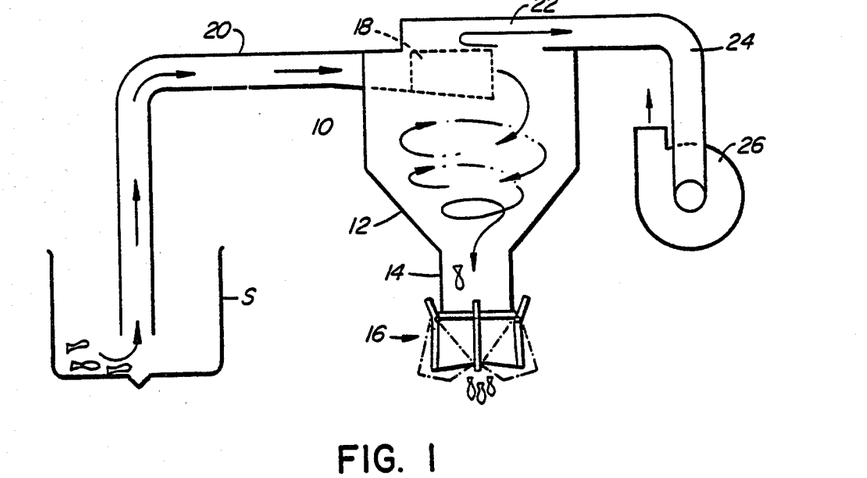
FIG. 1 is a diagrammatic view of a pneumatic conveying system incorporating an air lock valve in accordance with the invention.

Referring firstly to FIG. 1 there is shown a typical form of pneumatic conveying system employing an air lock valve in accordance with the present invention. The system includes a separating chamber 10 of circular cross section having a conical lower section 12, to the lower end of which is connected a head tube 14 also of circular cross section. The air lock valve arrangement in accordance with the invention is designated by reference number 16. The separating chamber 10 includes a tangentially arranged inlet opening 18 which is connected to an elongated inlet duct 20, the latter being sufficiently long as to extend into a material storage area, in this case the hold of a ship S which is berthed alongside a dock (not shown). Separating chamber 10 also includes an air outlet opening 22 of any suitable conventional design the latter being connected to an air exhaust conduit 24 which leads into the suction inlet of a fan 26. When fan 26 is turned on, a negative pressure is created within separator chamber 10 thus causing air to rush through the inlet duct 20 at a relatively high velocity thus carrying with it fish from the hold of the ship S. The fish enter the separator chamber 10 through the tangential inlet 18 and enter the swirling or rotating air flow within such chamber. As the fish move downwardly by virtue of gravitational forces they also move outwardly due to the centrifugal forces involved and thus spiral around the interior wall of chamber 10, eventually passing down into the material head tube 14. After a certain head of fish is built up in head tube 14, the fish begin to emerge from the lower end of the air lock valve 16 in a more or less continuous fashion while at the same time an air seal is being maintained for reasons to be hereinafter described.

Referring now to FIGS. 2–7, the air lock valve 16 is illustrated in detail. As noted previously, air lock valve 16 is connected to the lower end of head tube 14. The valve structure includes a frame 28 of square outline as seen in plan, the margins of frame 28 extending outwardly beyond the outer periphery of the generally circular head tube 14. Frame 28 is connected to the lower end of head tube 14 by means of a horizontally disposed air seal plate 32, the latter being welded to the lower end of head tube 14 all around its periphery with the outer extremities of air seal plate 32 being welded to the upper edge portions of frame 28.

Figure 2:
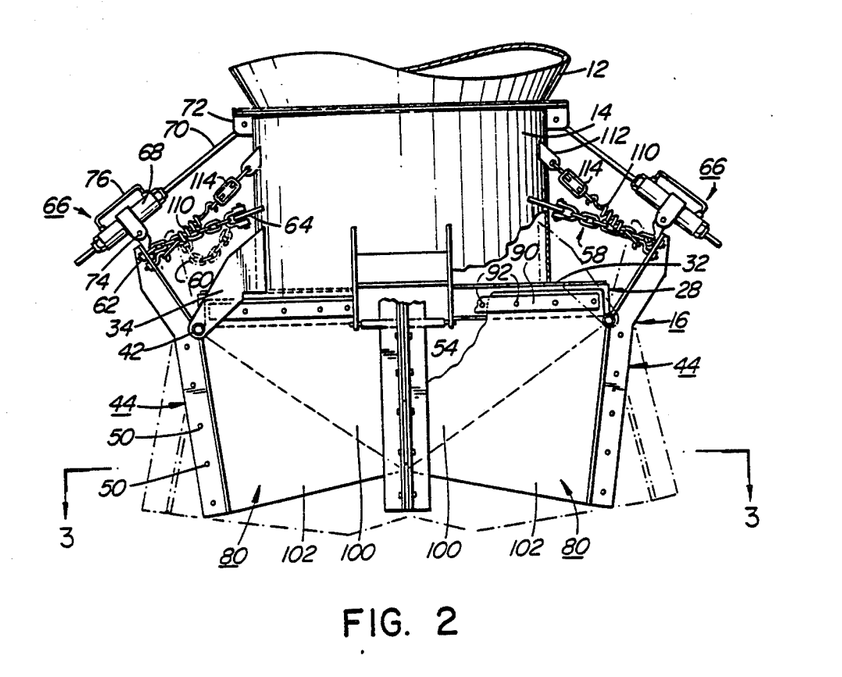
FIG. 2 is a side elevation view of an air lock valve in accordance with the invention connected to the lower end of a separator head tube.
Figure 5:
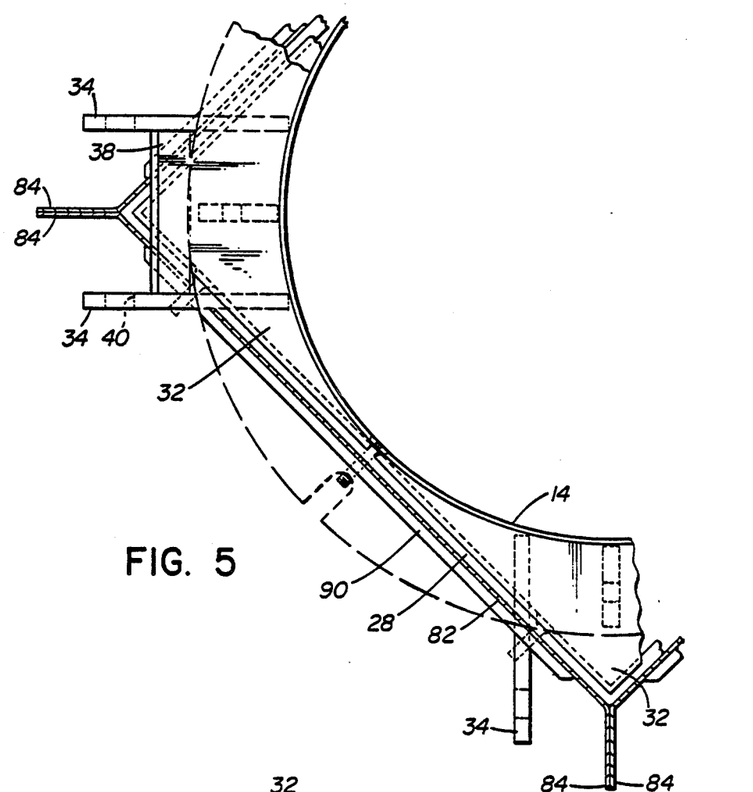
FIG. 5 is a partial top plan view of a portion of the valve showing portions of the hinge assemblies, the valve top frame and flexible panel clamping assembly.

As best seen in FIGS. 2 and 5, at each corner of frame 28 there are disposed a pair of spaced parallel hinge plates 34, the inner ends of such plates 34 being welded to the wall of head tube 14 with a reinforcing member 38 extending between each adjacent pair of hinge plates and also being welded to the upper surface of air seal plate 32 closely adjacent the associated corner of frame 28 thereby to provide the required degree of structural strength and stability. The hinge plates 34, as best seen in FIG. 2, are angled outwardly and downwardly with the outer end portions of same being provided with aligned openings 40 which serve to receive hinge pin 42.

Each pair of hinge plates 34 serves to carry a respective support arm 44, each support arm 44 pivoting about the pivot axis defined by its pivot pin 42. It will readily be seen from an inspection of FIGS. 2 and 5 that the support arms 44 are all arranged for pivotal movement in vertical planes which extend diagonally of the square outline type frame 28, such planes intersecting at the geometric center of frame 28.

The support arms 44 as illustrated each comprise a pair of metal angle members secured together in face-to-face relationship by means of a plurality of spaced apart fasteners 50. The upper end portion of each arm 44 is outwardly angled with respect to the lower portion of same, i.e. that part below pivot pin 42. Additionally, it will be noted that hinge pin 42 extends through a hinge tube 54 welded to the support arm, such tube 54 assisting in stabilizing support arm 44 and preventing significant lateral movement of the support arm between the hinge plates 34 as well as providing substantial lateral stability to such arm.

A stop assembly 58 is associated with each arm 44 for limiting the degree of pivotal motion of such arm which is allowed to take place inwardly of the frame 28. This comprises a short length of chain 60 which is interconnected between upper end 62 of the arm and a suitable bracket 64 welded to the head tube 14. The reason for having such stop means 58 will become more apparent hereinafter. Chain 60 is typically provided with a length adjustor whereby the inward limit of the arm pivotal motion may be adjusted.

Each support arm 44 is also provided with a damping assembly 66 as illustrated in FIG. 2. This assembly includes a double-acting oil filled cylinder 68 having a piston therein connected to an elongated piston rod 70. The upper end of piston rod 70 is pivotally connected to bracket 72 secured adjacent the upper end of head tube 14. The cylinder body 68 is pivotally mounted by assembly 74 to the extreme upper end of support arm 44. The cylinder body 68 is provided with an orifice tube 76 which extends intermediate the ends of the cylinder and controls the flow rate of oil from one end of the cylinder to the other as the piston moves relative to the cylinder during the course of pivotal motion of support arm 44. The damping effect thus provided inhibits unwanted bouncing or fluttering of each of the support arms 44 during use. This has been shown to occur in operation with transient pressures during start up or shut down of any such device fitted with springs only.

Figure 6:
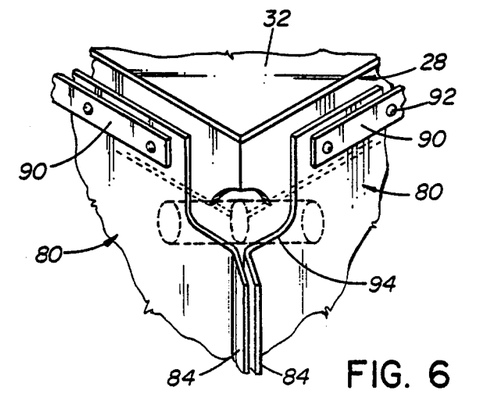
FIG. 6 is a perspective view of a portion of the valve frame showing the manner in which flexible panels are contoured at one of the frame corners.
Figure 7:
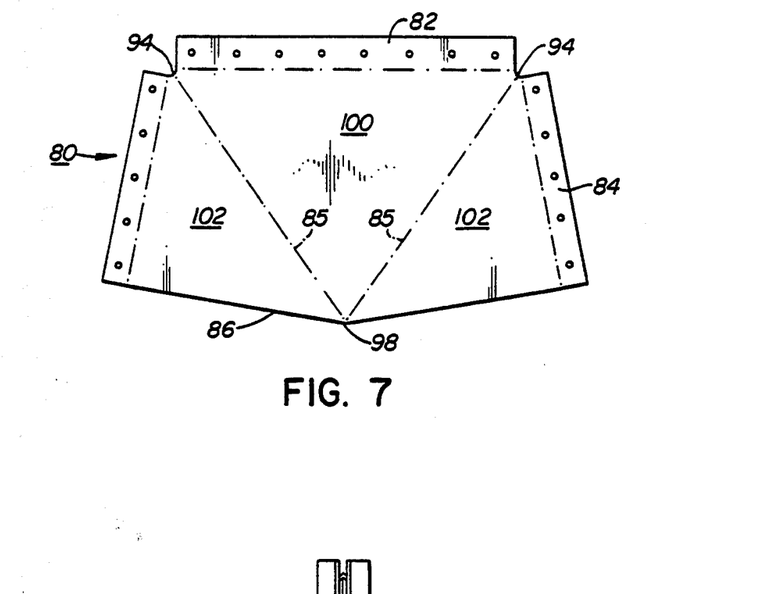
FIG. 7 is a layout of one of the flexible panels.

The air lock valve as illustrated includes four flexible panels 80, the preferred shape for same being best illustrated in FIG. 7. Each flexible panel is preferably made from a relatively thin reinforced elastomer with a ply or plies of woven material such that the panels are relatively flexible while at the same time strongly resisting any tendency to stretch under the influence of tension forces thereon. A typical panel 80 may comprise 1/16 inch thick neoprene diaphragm rubber sheet or polyurethane elastomer sheet, in both cases reinforced with woven polyester cloth plies. As seen in FIG. 7 each panel includes a top fastening margin 82, a pair of marginal side fastening margins 84 which diverge away from one another from the top margin to the bottom edge, and shallow unstiffened V-shaped bottom edge 86. Each panel 80 is connected between an adjacent pair of the support arms 44 in a manner such that each of the side fastening margins 84 is connected to that of the adjacent panel along the length of the associated arm. The way this is done is clearly illustrated in the drawings wherein it is seen (FIG. 3) that the side fastening margins 84 of adjacent panels are brought together and disposed between the angle members which go to make up the associated support arm 44 with such angle members being secured together by the previously noted spaced apart fasteners 50 so that such side fastening margins of the four panels 80 are securely connected in air tight fashion along the lengths of the several arms 44. It should also be noted that the top fastening margins 82 of the four panels are securely connected to and around the periphery of frame 28. In order to provide a secure air-tight connection between them, it will be seen that such top fastening margins 82 of the panels are sandwiched between the outer face or periphery of frame 28 and an associated clamping bar 90. Clamping bar 90 is provided with a series of spaced apart apertures through which suitable fasteners 92 are passed with the result being that the top fastening margins of the several panels are firmly secured in air-tight fashion to frame 28. The upper corners of each panel are provided with cut-outs or notches 94 as best illustrated in FIG. 7 with the apex of the notch being smoothly concavely contoured so that in the assembled condition of the panels, such notch portions 94 come into close sealing contact with the hinge tubes 54 associated with the respective support arms 44. Reference may be had to FIG. 6 for a better understanding of the configuration immediately adjacent the corners of the frame 28. Not only are the panels notched as at 94 but furthermore a suitably contoured notch 96 is provided in the lower portion of the frame 28 at each corner thereby to accommodate and conform to the contour of the above-noted support arm hinge tube 54.

Figure 3:
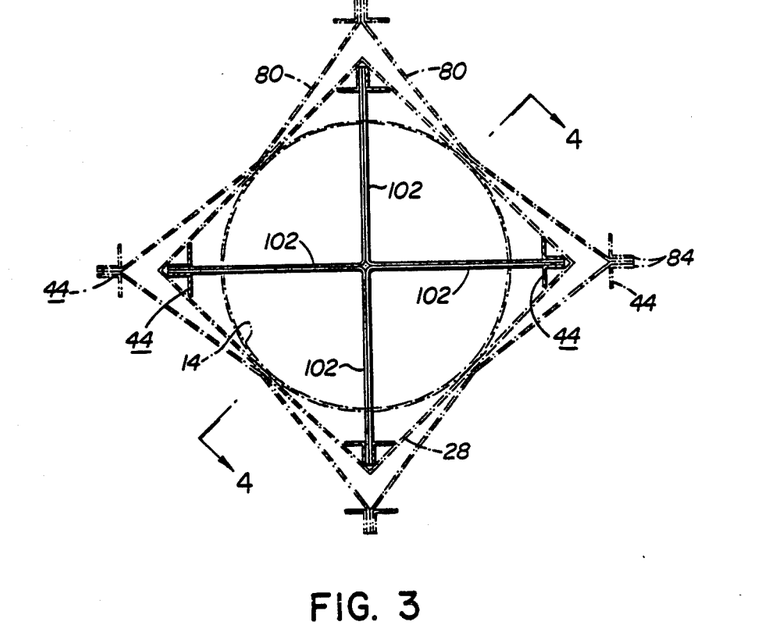
FIG. 3 is a section view of the valve taken along line 3—3 of FIG. 2, certain of the structures above the section plane being shown in phantom thereby to better illustrate the relationship between the several major parts.

With reference to FIGS. 2 and 3, the dashed line positions of the support arms and flexible panels clearly illustrate that the panels together form an open ended sleeve-like structure in the open position of the valve.

By virtue of the configuration of the flexible panels 80 and the manner in which they are connected to the support arms 44, when a negative pressure is set up within the separator chamber, the initial inward rush of air through the open valve sets up a sufficient pressure on the panels 80 as to cause support arms 44 to pivot inwardly. As these arms pivot inwardly, the panels 80 fold about a pair of lines 85, which lines 85 extend from the region adjacent to the outer extremities of the top fastening margins 82 of each panel to a point 98 located mid-way along the bottom edge 86. Accordingly, panel 80 becomes divided by the folds 85 into an intermediate triangular area 100 flanked by a pair of marginal triangular areas 102. As the support arms 44 continue to pivot inwardly and reach the limit defined by the stop assemblies 58, such marginal triangular areas 102 come into face-to-face relation with the marginal triangular areas of the panels 80 next adjacent thereto. At the same time, the intermediate triangular areas 100 of the four panels together form a pyramid-like configuration having an apex defined at the location where the points 98 on the bottom edges of the panels come together and with the base of such pyramid-like configuration being defined by the panel portions immediately adjacent the periphery of the frame 28.

Figure 4:
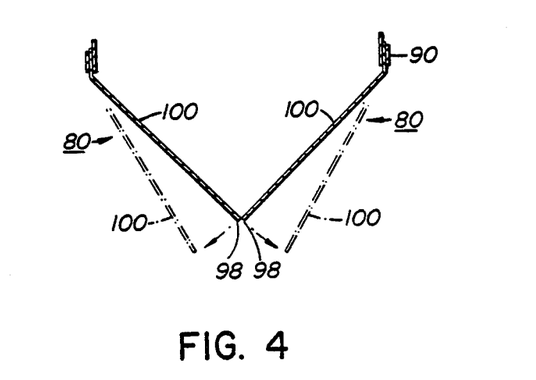
FIG. 4 is a partial section view taken along the line 4—4 of FIG. 3 and showing portions of the flexible panels in the closed and partly open positions.
Figure 8:
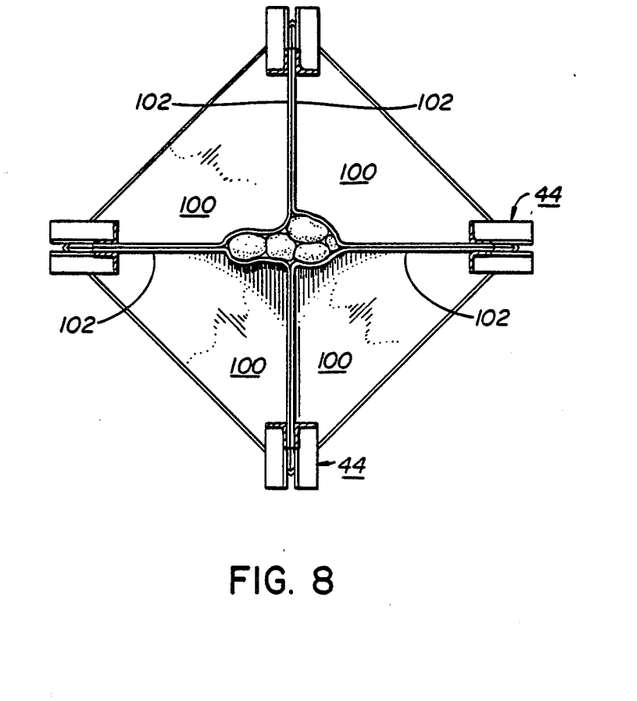
FIG. 8 is a bottom plan view of the air lock seal illustrating the manner in which flexible panel material molds itself around articles passing through the apex region of the seal.

In order to better understand the above process by which the panels come into sealing relationship with one another, reference may also be had to FIGS. 3 and 4 which are section views taken along lines 3—3 in FIG. 2 and lines 4—4 of FIG. 3 respectively. With reference to FIG. 4 it will be seen that the intermediate triangular areas 100 of an opposing pair of panels 80 have moved inwardly from the dashed line positions to the full line positions until the points 98 of each come into contact with one another. With reference to FIG. 3, the dashed line positions of the panels 80 represent the full open position of the valve with the lower ends of the support arms 44 being in their outermost positions. The full line positions of the lower ends of the support arms 44 correspond to the closed condition of the valve. In the closed position, the above-mentioned marginal triangular areas 102 of adjacent panels come into face-to-face sealing relationship with one another. It should be appreciated that in the closed condition of the valve, by virtue of the shape of the panels 80 and the manner in which they cooperate with the support arms 44, the fabric reinforced rubber panels in effect form a catenary-like surface with the panels thus being stressed only in tension. This prevents any tendency for buckling or misalignment to occur under high negative pressures and provides a controllable and consistent air seal. A further feature is that the material or articles being separated out in the separation chamber can push their way through the apex of the pressurized pyramid seal by virtue of the weight of collected material above it. The relatively thin flexible panels tend to mold themselves around large irregular objects thus maintaining the necessary tight air seal during discharge. This is illustrated in FIG. 8 wherein a bottom plan view of the pyramid-like seal arrangement is shown. A further advantage of the air seal is that virtually no bruising, crushing or slicing of the product passing through occurs because most of the air pressure load is supported by the catenary-like surface and transferred to the support frame and/or is supported by the adjacent panel portions 102 which are in contact with each other.

With reference to FIG. 3, it will be seen that the panels 80, when opened to maximum extent, present a flow area larger than that of the material head tube 14 (shown in phantom). Thus there is no physical obstruction to the free passage of very large objects which can clear the head tube 14.

Referring again to FIG. 2, there is shown a means for resiliently biasing support arms 44 toward the open position so as to assist the material which is to pass through the valve in opening same against the influence of the air pressure forces created by the partial vacuum in the separating chamber. The biasing means shown in FIG. 2 is a coil tension spring 110 interconnected between bracket 112 attached to the upper portion of head tube 14 and a suitable eye bolt connected adjacent the upper end of the support arm extension. A turn-buckle arrangement 114 is conveniently provided thereby to allow the spring tension to be adjusted. These springs 110 are slack in the partially opened position of panels 80 and, of course, are under maximum tension when the panels are fully closed. During start-up, the in rush of air applies sufficient pressure to panels 80 as to slowly close them and bring them into an air tight sealing position as described above. It should be noted here that the loading imposed by springs 110 is not in itself sufficient as to force the panels open. However, by making suitable adjustments to these springs, a relatively free and continuous discharge of the articles being handled is permitted without the necessity of accumulating a large mass or weight of material in head tube 14 to initiate the valve opening and dumping process.

Figure 9:
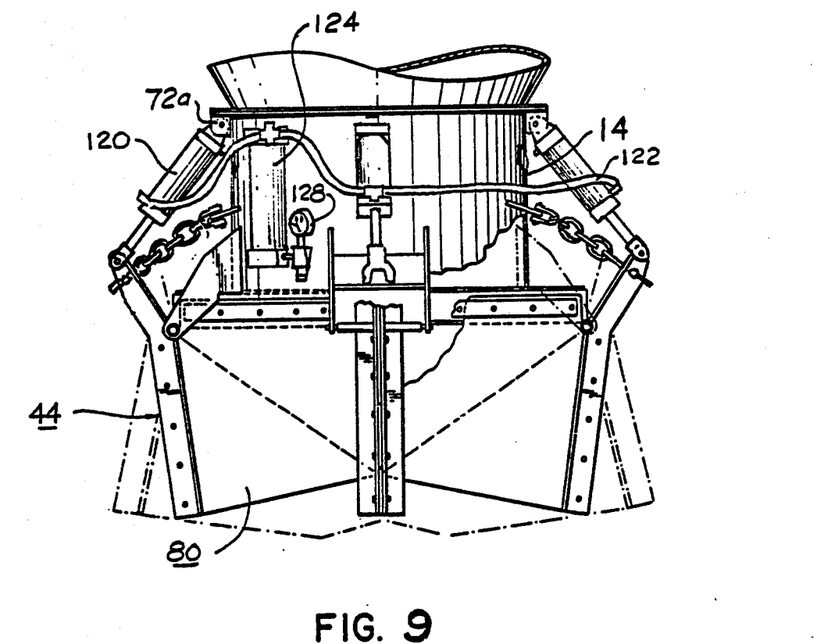
FIG. 9 is a side elevation view of an alternative embodiment.
Figure 10:
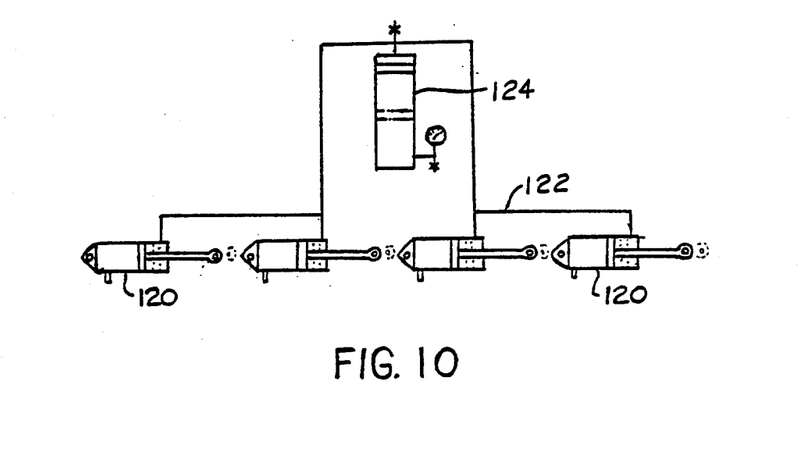
FIG. 10 is a schematic diagram of the hydraulic circuit associated with the embodiment of FIG. 9.

FIGS. 9 and 10 illustrate an alternate form of arrangement wherein the functions of the previously described tension spring and viscous damper have been combined in a self-contained regenerative hydraulic system. Such system includes several conventional hydraulic cylinders 120 interconnected between the upper end of each support arm 44 and associated bracket 72a, the latter located adjacent the upper end of head tube 14. Hydraulic lines 122 connect the rod end part of cylinders 120 with the oil filled side of the oil over air accumulator 124. The lower end of accumulator 124 is provided with an air charging valve, and an air pressure gauge 128 is provided.

During operation, as the support arms 44 pivot inwardly under the influence of air pressure on panels 80, the rods of the cylinders 120 are drawn outwardly; at the same time the oil displaced by this action flows into the upper end of accumulator 124 via hoses 122. Thus the accumulator stores energy in much the same way as the previously described springs and provides a similar result. At the same time the flow resistance of the oil through the hydraulic lines and fittings provides the desired degree of damping. If insufficient damping is present, a flow restrictor (not shown) may be placed in the hydraulic lines.

Prototype tests were conducted for the various types of discharge air valve. Each had the same 17 inch head tube diameter; all were pressurized to 13 inches water gauge during material entry. The test material used in this instance was potato. The results of the tests were as follows:

(a) A plain cylindrical (prior art) sleeve valve required 630 lbs. of material to be accumulated in the head tube before dump occurred. Discharge occurred suddenly and en masse. The air seal was not consistent; seal edge misalignment occurred after dumping resulting in air leakage.

(b) The unassisted (i.e. no biasing devices) pyramid valve according to the invention required 500 lbs. of material to be collected under the same pressure. This dumped suddenly and in mass. The flexible panels conformed to the contour of the mass during dumping and these panels thereafter realigned themselves precisely for an air tight seal.

(c) The bias assisted pyramid valve required 80 lbs. material to start the dumping of the product after which the exit flow of material was continuous and proportional to the rate at which material was added to the separation chamber by the conveying system. The air seal was consistently good at all times (i.e. during the passage of product); hence there was no interruption of the conveying process.

The operation of the air lock valve described above has clearly proven to be superior to the usual prior art arrangements. In summary, its major advantages are:

no significant material cutting, crushing, or bruising;

works on a wide variety of wet, moist, or dry material as well as many accumulated slurrys or liquids;

works and seals equally well on fine powders or large objects such as 60 lb. codfish. Continuous air seal even during discharge of large objects;

continuous flow of material discharge as it is being fed to system; eliminates problems with subsequent handling of mass material flow;

no periodic interruption in suction pressure or in the conveying operation being carried on;

usuable at high pressure differentials (e.g. 25–80" wg). (The panel support system prevents panel buckling or misalignment and the pre-load biasing system can be adjusted to allow a small quantity of material to open the panels).

no external electric or hydraulic power system or level control system is required, (yet system is totally automatic with assisted, gravity operation);

reliable due to simplicity;

no water usage for seal and hence no supply or environment problem.

I claim:

1. An air lock valve for use in a pneumatic conveying or handling system, comprising:
   (a) an outline type frame adapted to be connected to the outlet of a separator chamber which, in use, operates under a negative pressure;
   (b) a plurality of support arms pivotally connected to said frame in spaced apart relation thereabout and arranged for pivotal movement inwardly and outwardly relative to the center of the frame in planes passing generally through the center of said frame;
   (c) stop means for limiting pivoting motion of said arms inwardly of the frame;
   (d) means defining a plurality of flexible panels each having a top fastening margin, the top fastening margins of said panels being connected to and around said frame, a pair of opposed side fastening margins, each panel being connected between an adjacent pair of said arms with each side fastening margin being connected with that of an adjacent panel along an associated one of said arms in air tight fashion, each panel having a bottom edge which is free to flex;
   (e) said flexible panels having a configuration such that under the influence of a negative pressure in the chamber during use, said arms are caused to pivot inwardly with the panels folding about lines extending from regions adjacent the outer extremities of the top fastening margin of each panel to a point mid-way along the bottom edge of the panel so that the panel is divided by the folds into an intermediate triangular area flanked by a pair of marginal triangular areas so that as the arms continue to pivot inwardly and reach the limit defined by said stop means, said marginal triangular areas of adjacent panels come together in face to face relation with one another, with the intermediate triangular areas together forming a pyramid-like configuration having an apex defined at the location where said points on the bottom edges of the panels come together, the flexible panels being stressed substantially solely in tension under the influence of the air pressures thereon.

2. The air lock valve of claim 1 wherein said flexible panels are sufficiently flexible as to partially mold themselves around solid objects passing through said valve and outwardly of the apex region of said pyramid-like configuration.

3. The air lock valve of claim 1 or 2 further including means resiliently biasing said arms toward the open position so as to assist material which is to pass through said valve in opening same against the influence of air pressure forces which, in use, are created by the negative pressure in the separator chamber.

4. The air lock valve of claim 1 or 2 further including means resiliently biasing said arms toward the open position so as to assist material which is to pass through said valve in opening same against the influence of air pressure forces which, in use, are created by the negative pressure in the separator chamber, and damping means associated with said arms to reduce bouncing of same and fluttering of the panels under the influence of the air pressures and the resilient biasing forces thereon.

5. The air lock valve of claim 1 or 2 wherein four said flexible panels are provided together with four said arms such that the pyramid-like configuration provided in the closed position of the valve is a rectangular pyramid.

6. The air lock valve of claim 1 or 2 wherein the flexible panels are made from a substantially non-stretchable material.

* * * * *